US006733702B2

(12) United States Patent
Ciesa et al.

(10) Patent No.: US 6,733,702 B2
(45) Date of Patent: May 11, 2004

(54) TIRE MOLD AND A METHOD OF RAPIDLY DEPRESSURIZING THE MOLD

(75) Inventors: Clifford Jack Ciesa, Akron, OH (US); Jean-Marc Francois Fortin, Delano, PA (US); Joseph Alan Incavo, Uniontown, OH (US); Michael Eugene Porter, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 463 days.

(21) Appl. No.: 09/838,623

(22) Filed: Apr. 19, 2001

(65) Prior Publication Data

US 2002/0153629 A1 Oct. 24, 2002

(51) Int. Cl.[7] .............................................. B29C 35/00
(52) U.S. Cl. ...................... 264/36.14; 264/326; 425/21; 425/36; 425/58
(58) Field of Search ................................. 264/501, 315, 264/326, 36.14; 425/36, 44, 49, 58, 17, 21, 24, 25

(56) References Cited

U.S. PATENT DOCUMENTS

| 3,612,345 | A |   | 10/1971 | Fike, Jr. ................. 220/89 A |
|-----------|---|---|---------|-------------------------------------|
| 3,830,605 | A | * | 8/1974  | Pechacek                            |
| 4,062,287 | A |   | 12/1977 | Millray ........................ 102/39 |
| 4,222,721 | A | * | 9/1980  | Gado .......................... 425/58 |
| 4,529,367 | A | * | 7/1985  | Fike ............................. 425/58 |
| 4,738,604 | A | * | 4/1988  | Fike et al.                         |
| 5,766,644 | A | * | 6/1998  | Solberg                             |
| 5,954,081 | A |   | 9/1999  | Everhard et al. ........ 137/68.23   |

FOREIGN PATENT DOCUMENTS

JP          10000678 A2     1/1998

\* cited by examiner

Primary Examiner—Mathieu D. Vargot
(74) Attorney, Agent, or Firm—David L. King

(57) ABSTRACT

A tire mold 2 for curing new or retreaded tires 20 has an upper platen 4, a lower platen 6, and a central rim 30 with a frangible member 50 designed to open when a predetermined pressure $P_1$ in excess of the normal curing pressure $P_c$ is observed. The frangible member 50 preferably includes a rupture disk 60 that breaks upon exposure to the pressure $P_1$.

9 Claims, 5 Drawing Sheets

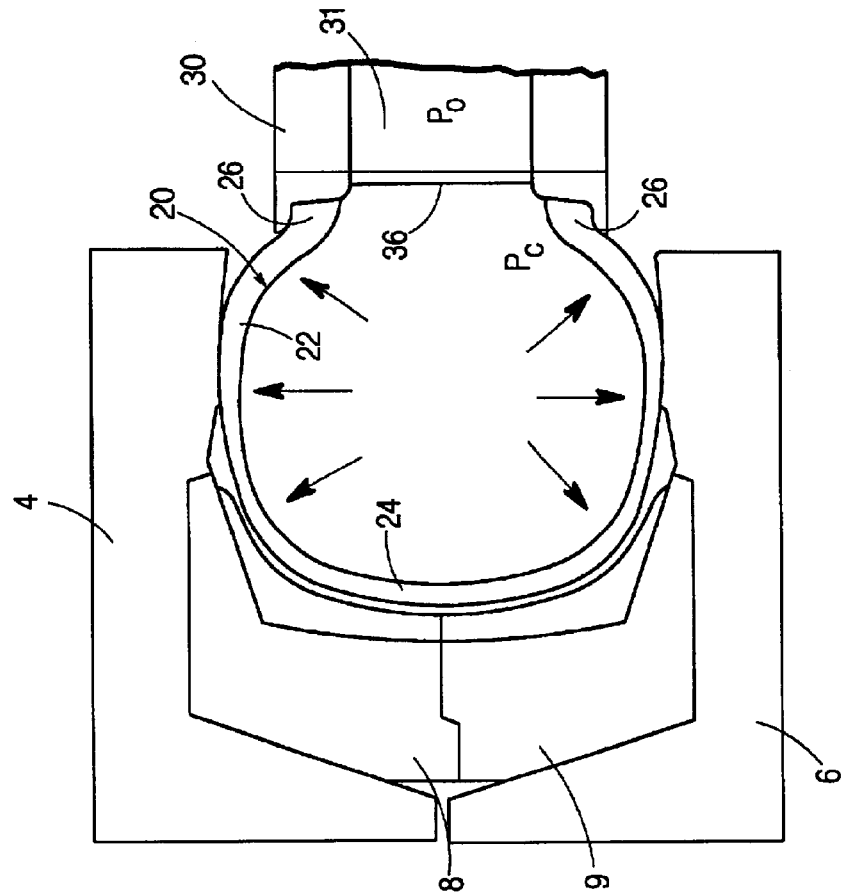
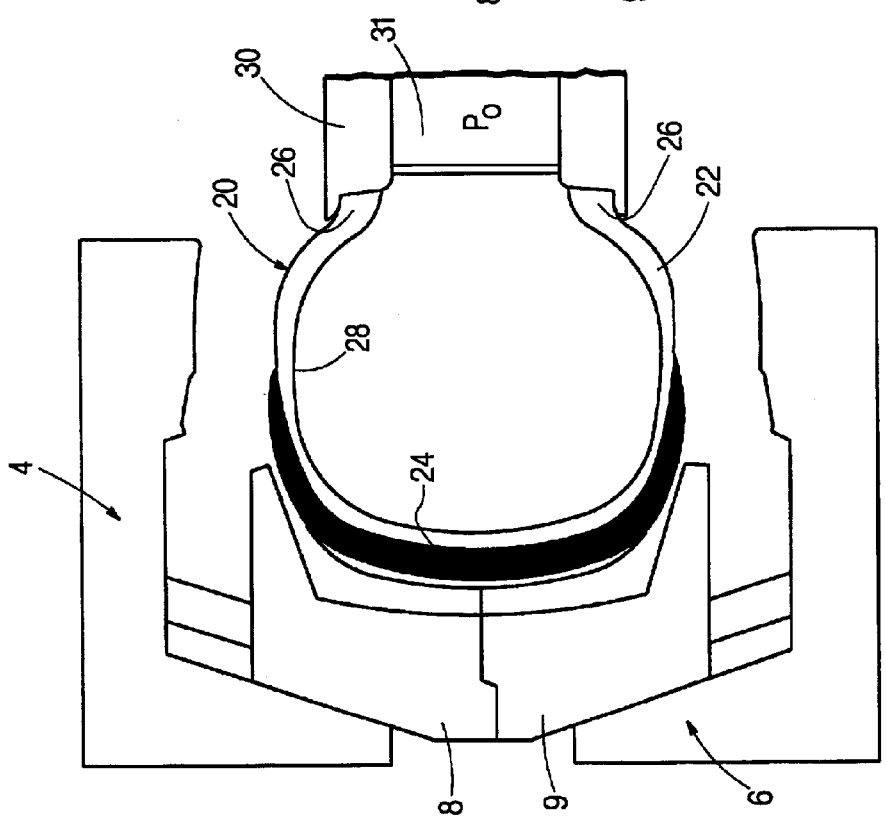

TIRE MOLD AND A METHOD OF RAPIDLY DEPRESSURIZING THE MOLD

TECHNICAL FIELD

This invention relates to tire molds generally more particularly to large molds for off road tires. The invention is particularly useful in a class of molds commonly used in retreading large tires.

BACKGROUND OF THE INVENTION

In the manufacture of large tires for earthmoving, construction, and in some cases, farm tire applications, very large molds are employed to cure the tires.

Additionally, in most applications these tires are well suited for retreading. Retreading involves the practice of taking worn or used tires, grinding the remaining tread surface, and applying a new layer of tread rubber, which when cured in a retread mold, forms the tread pattern. This renewal process extends the life of the tire and can result in a substantial cost savings to the end user.

This added tread rubber is often 6 inches to over 12 inches thick. In order to cure such a thick component the cure cycles can take from 6 to almost 24 hours. Rubber products, when cured over such a large period must be exposed to minimum temperatures at reasonably low pressures, generally under 300° F. and under 200 p.s.i., preferably about 180 p.s.i.

On rare occurrences when retreading a used tire, volatiles are expelled from the interior of the casing and mixed with the heated air. If a sufficient quantity of such volatiles are expelled into the heated air chamber, an ignition can occur resulting in a rapid increase in pressure. Due to the large size of the molds, sometimes 10 ft. in diameter and larger, these rapid pressure increases can result in damaged presses caused by warpage and cracking. In most severe cases wherein a leakage does not occur, then the upper platen can become dislodged or broken. Naturally due to the very large size of these molds, dislodged components weighing in excess of a ton are very undesirable.

Attempts to minimize such occurrences have led some to consider employing nitrogen to pressurize the curing press instead of air. Nitrogen will not support combustion. A primary drawback of the use of nitrogen is that exposure by humans to high levels of nitrogen results in nausea, headaches and asphyxiation. Containing the chamber fluid is considered desirable, but experience shows that repeated mixing of the nitrogen with the tires' normal outgasing of volatiles and oxygen results in said systems being in constant need of monitoring and replenishing.

The present invention attempts to achieve normal air curing without requiring such extreme measures, such as nitrogen curing.

The present invention has a primary objective of preventing exposure to rapid increases in pressure with the purpose of eliminating such conditions long before they can cause damage to the molds.

SUMMARY OF THE INVENTION

A method of rapidly depressurizing a mold for curing retreaded or new tires is disclosed. The mold has an upper platen, a lower platen and a central rim for sealing the tire at the beads. The central rim is open to atmospheric pressure $P_o$ at the radially inner surfaces. The radially outer surfaces of the central rim, in combination with the upper platen and lower platen, form a toroidal pressure chamber for curing the tire.

The method comprises the steps of providing a frangible member attached and open to the toroidal pressure chamber through an opening in the central rim and opening the frangible member to the atmospheric pressure $P_o$ when the chamber pressure reached a predetermined pressure $P_1$, $P_1$ being greater than the tire casing pressure PC.

Preferably, the step of opening the frangible member includes the step of rupturing a portion of the frangible member at the predetermined pressure $P_1$. Most preferably, once the frangible member opens, the chamber exhaust flow is directed orthogonal relative to the attachment to the rim.

The above method is practiced in an improved mold for curing retreaded or new tires. The mold has an upper platen, a lower platen, and a central rim.

The central rim has a radially inner surface open to the atmospheric pressure and radially exterior surface which, in combination with the upper platen and lower platen, form a toroidal pressure chamber for curing a tire. The improved mold has a frangible member attached to an opening in the central rim and is connected on a radially inner surface of the rim. This frangible member opens to atmospheric pressure $P_o$ when the chamber pressure reaches a predetermined pressure $P_1$, $P_1$ being greater than the tire curing pressure $P_c$. Preferably the frangible member has a rupture element breakable at a predetermined pressure $P_1$. Most preferably $P_1$ is in the range of 200 to 250 p.s.i. The frangible member has a flow diverter for redirecting the exhaust flow 90° relative to the path exiting the rim. Ideally, the exhaust flow is centrally directed within the central rim.

BRIEF DESCRIPTION OF THE DRAWINGS

FIGS. 2A and 2B are cross-sectional views of the mold according to the invention.

DETAILED DESCRIPTION OF THE INVENTION

Figure 1:
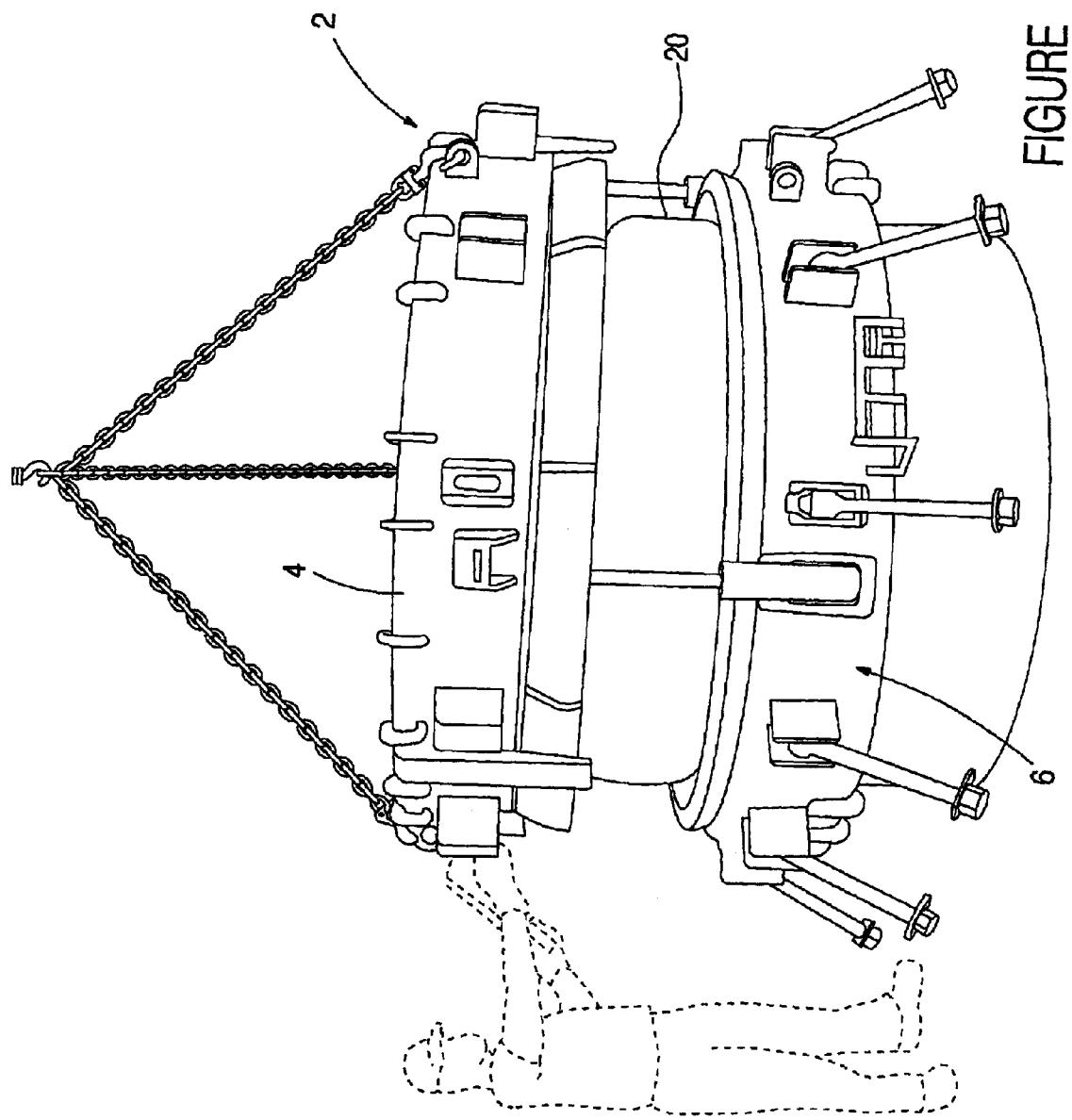
FIG. 1 is a view of the mold according to the invention.

With reference to FIG. 1 there is shown one large earthmover retread tire mold 2. The mold 2 has an upper platen 4 and a lower platen 6. Interposed between the upper platen and lower platen is shown the tire 20.

As in FIGS. 2A and 2B the cross-sectional view of the mold 2 shows both the upper platen 4 and the lower platen 8, including segments 8, 9 for forming the tread pattern of the tire. As shown in FIG. 2B the lower segments 9 interlock with the upper segments 8 and the upper and lower platens 4, 6 hold both segments 8, 9 in a restrained position when the mold 2 is closed during curing.

The tire casing 22 and the uncured tread rubber 24 come in contact with the tread forming segments 8, 9. The rim 30 presses against the bead portion 26 of the tire 20.

Figure 3:
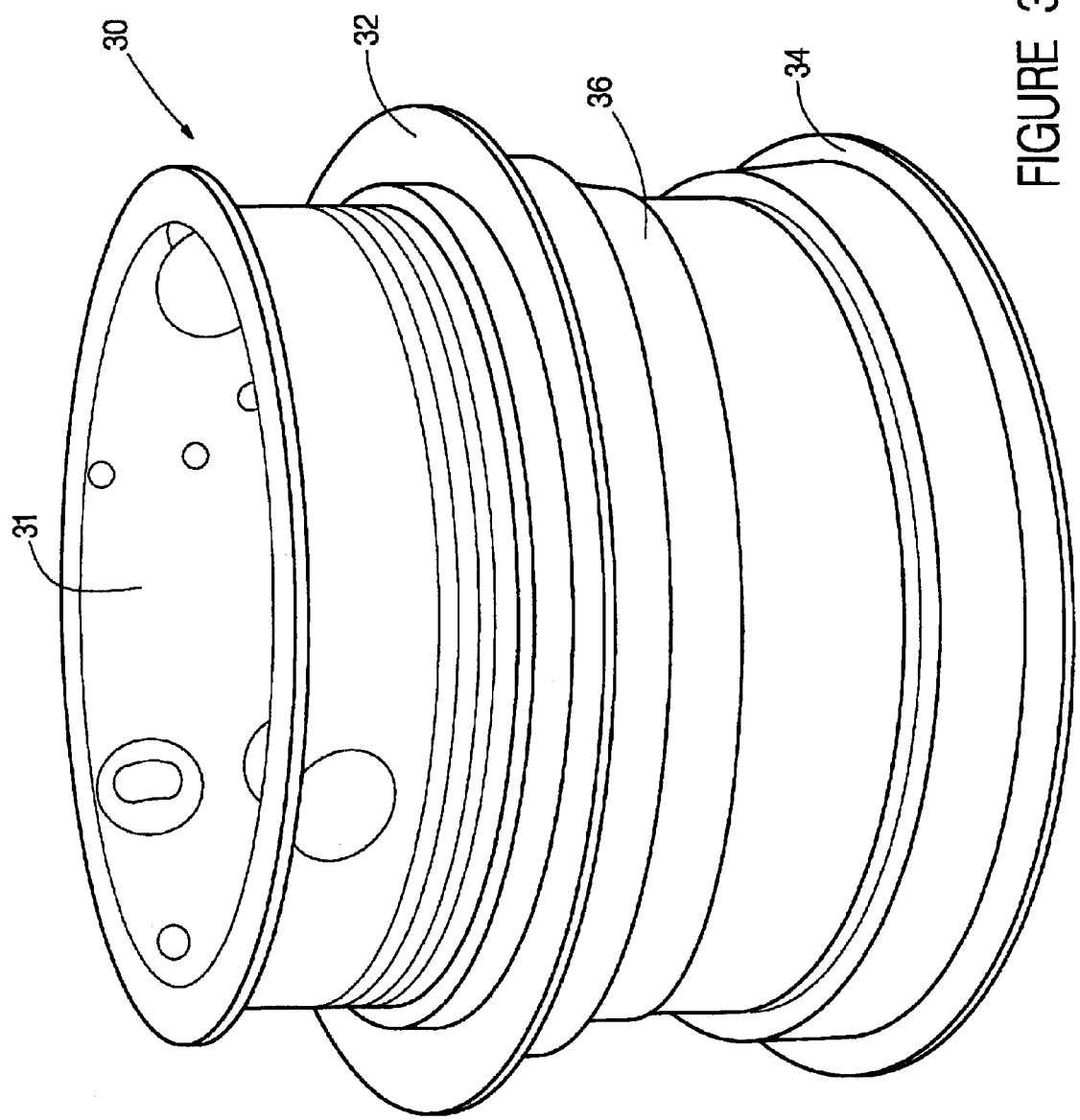
FIG. 3 is a view of the rim according to the invention.
Figure 5:
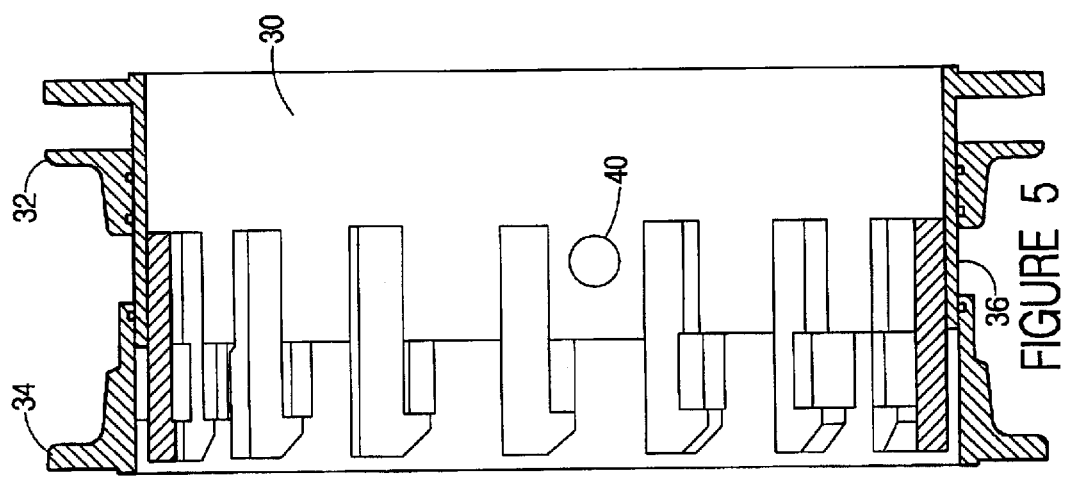
FIG. 5 is a cross-sectional view of the central rim.

With reference to FIG. 3, the rim 30 as shown is a Compression Cure® System SuperRim from Ohio Machine and Manufacturing Co. of Los Angeles, Calif. The rim 30 has an adjustable bead width flange 32 which allows adjustments in width bead 26 to bead 26 as required for the mold 2. This type of rim 30 allows for tubeless curing. While the particular type of mold or rim is not relevant to the invention, it is important that the central core forming the tire be a rim or rim type structure open to the atmosphere in the center as will be appreciated with further reading of this description.

Once the mold is closed as shown in the view 2B the heat and pressure are applied to the internal surfaces 28 of the tire 20. The pressure $P_c$ generally is in the range of 165 to 200 p.s.i. and is held generally constant during the cure cycle. The cure cycle can be from a few hours to over 12 hours or longer.

As discussed earlier, in rare occasions the tire 20 may outgas volatile vapors that can result in an ignition causing a rapid increase in pressure. This can result in mold damage and product loss.

Figure 4:
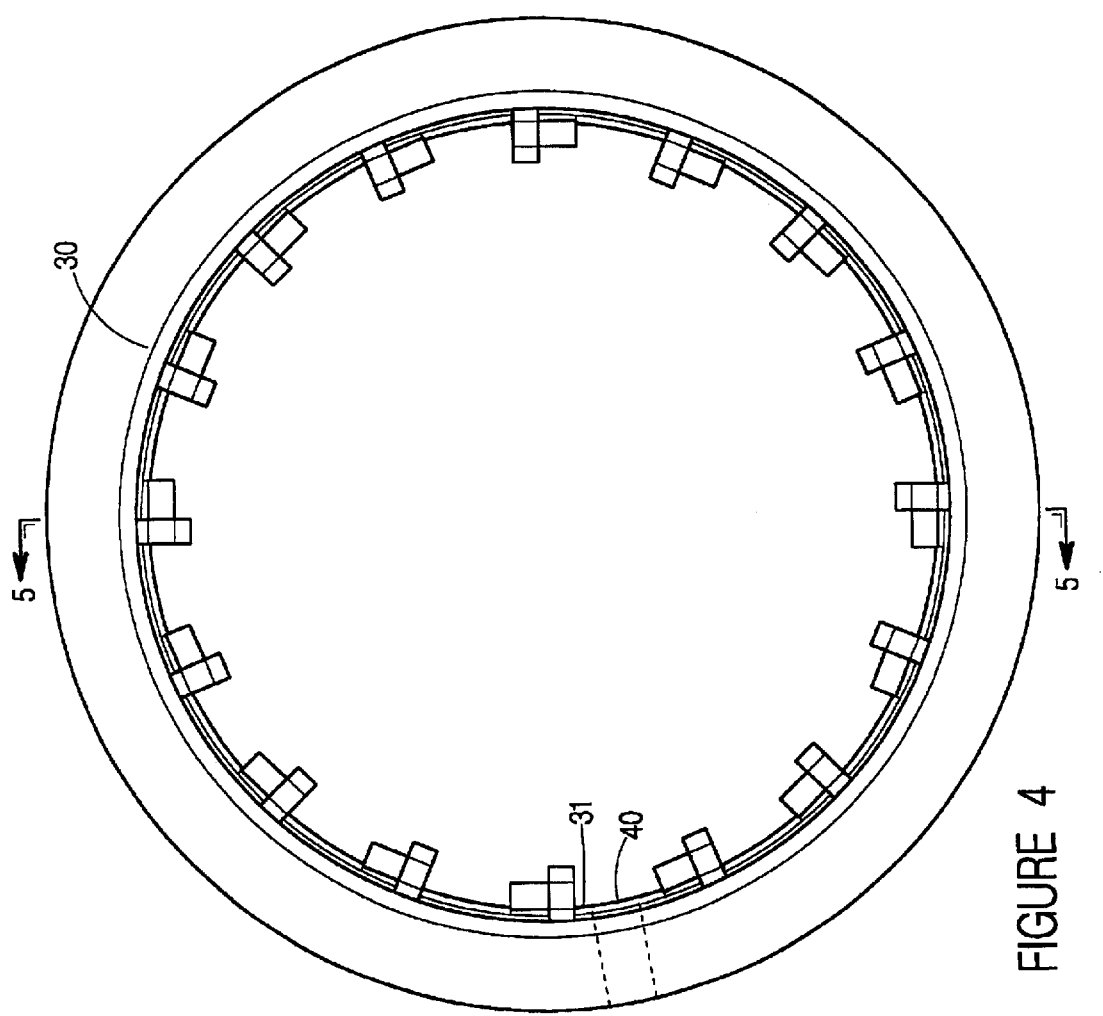
FIG. 4 is a top view of the rim.

The present invention takes advantage of the rim 30 having a central area open to atmospheric pressure. As shown in FIG. 4 a hole or opening 40 is placed in the central portion of the rim 30 between the flanges 32, 34. The central portion 36 is in direct open communication with the pressurized heated air in the tire 20. Welded to the rim 30 at the opening 36 is a frangible member 50 as illustrated in FIG. 7.

Figure 7:
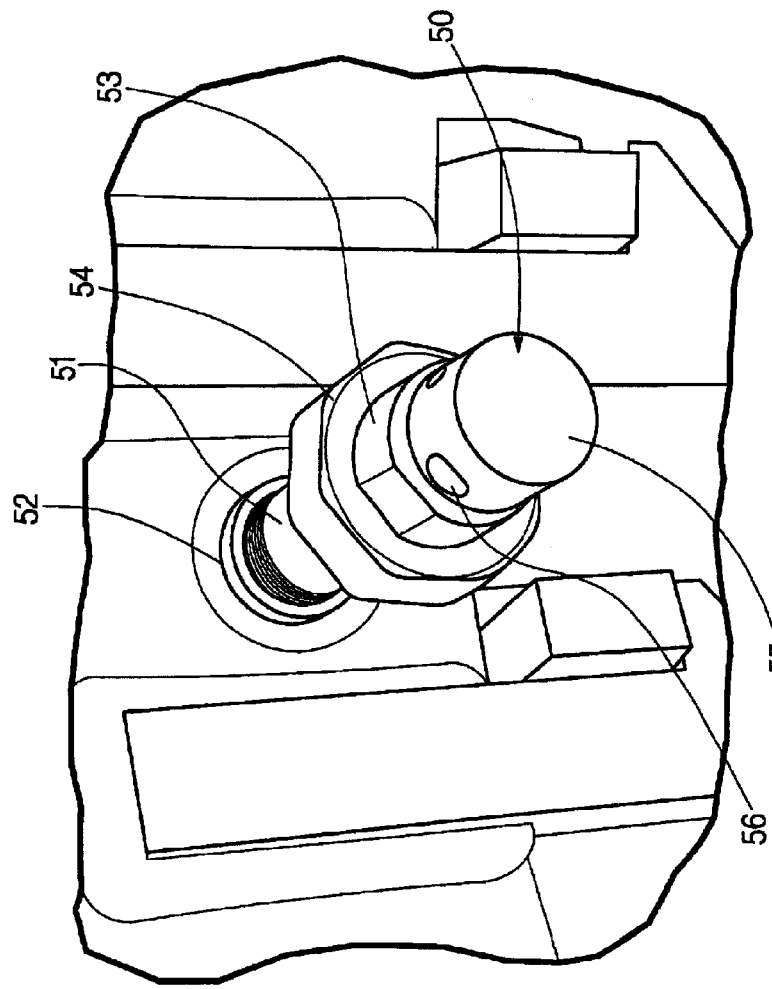
FIG. 7 is a partial view of the frangible member attached to the inner surface of the rim.
Figure 6:
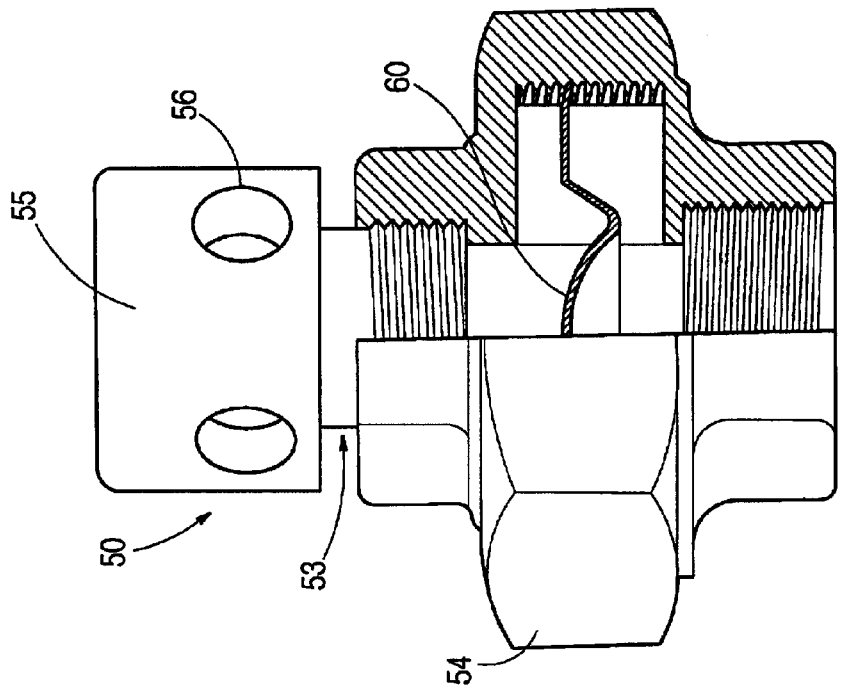
FIG. 6 is an enlarged cross-sectional view of the frangible member.

With reference to FIG. 7 the frangible member 50 is shown. This device has a threaded first flanged pipe 51 fitting attached to a thread flange 52 welded to the rim 30 on the internal surf ace 31 and another second threaded flanged portion 53 fastened to the first portion 51 by a large coupling nut 54. The second portion 54 has an end cap 55 with holes 56 for diverting the flow exhaust 90° relative to the opening in the rim 30. Internal to the two portions 51, 53 is a rupture disk 60. The rupture disk 60 is specifically designed to break at a predetermined pressure $P_1$, the pressure being set above the cure pressure $P_c$. Once the rupture disk 60 breaks, the chamber cure pressure $P_c$ rushes out of the tire 20 and the mold 2 is quickly and safely vented.

The frangible member 50 shown is a BS&B Union Type safety head. The fittings 51, 53, 54 are made of carbon steel or 316 stainless steel. Brass, nickel Monel aluminum and other types of metals can be used. The rupture disks 60 can be made of metal or composites and are commercially available in a variety of materials and designs for the particular application.

While it is considered possible to accomplish this venting action by using a pressure relief valve, it has several drawbacks, the first being the reliability of such a valve. As those skilled in the art know, such valves are prone to sticking and malfunctioning over time. The rupture disks 60 are very reliable and once they fail, a new one is substituted unlike valves that once activated, they are simply reset. Applicants further find valves occlude or block when exposed to rubber particulate matter. Rupture disks 60 are immune to this problem.

A key feature of this invention is the fact that the frangible member 50 must be open to the internal surfaces of the tire 20. Relief valves are known to be used in molds, but in the case of a tire mold, any pressure relief done on the exterior surface of the tire 20 is prone to failure, the reason being the tire itself would seal against the opening preventing the depressurization from occurring. It is when the unique combination of a mold 2 with a central core or rim 30 open to atmospheric pressure is used in this type of molding that one can safely and reliably vent the cure pressure $P_c$ in the manner described herein.

What is claimed is:

1. A method of rapidly depressurizing a mold for curing retreated or new tires, the mold having an upper platen, a lower platen, and a central rim for sealing the tire at the beads, the central rim being open to atmospheric pressure at the radially inner surfaces, the radially outer surfaces in combination with the upper platen and lower platen forming a toroidal pressure chamber for curing the tire; the method comprising the steps of:

providing a frangible member attached and open to the toroidal pressure chamber through an opening in the central rim; and opening the frangible member to the atmosphere pressure $P_o$ when the chamber pressure reaches a predetermined pressure $P_1$, $P_1$ being greater than the tire curing pressure $P_c$.

2. The method of rapidly depressurizing a mold for curing retread or new tires of claim 1 wherein the step of opening the frangible member includes the step of rupturing a portion of the frangible member at the predetermined pressure $P_1$.

3. The method of rapidly depressurizing a mold for curing retread or new tires of claim 1 further comprises the step of directing the chamber flow exhaust orthogonal relative to the attachment to the rim.

4. An improved mold for curing retreaded or new tires, the mold having an upper platen a lower platen a central rim, the central rim having a radially inner surface open to atmospheric pressure and an exterior surface in combination with the upper platen and lower platen forming toroidal pressure chamber for curing a tire; the improved mold being characterized by a frangible member being attached to an opening in the central rim and being connected on a radially inner surface of the rim, the frangible member opens to atmospheric pressure $P_o$ when the chamber pressure reaches a predetermined pressure $P_1$, $P_1$ being greater than the tire curing pressure $P_c$.

5. The improved mold of claim 4 wherein the frangible member has a rupture element breakable at the predetermined pressure $P_1$.

6. The improved mold of claim 4 wherein the mold is for large off-road tires.

7. The improved mold of claim 4 wherein the frangible member opens at predetermined pressures in the 200 to 250 p.s.i. range.

8. The improved mold of claim 4 wherein the frangible member has an exhaust flow diverter for redirecting the flow 90° relative to the path exiting the rim.

9. The improved mold of claim 4 wherein all exhaust flows are centrally directed initially within the central rim.

* * * * *